United States Patent
Utsunomiya et al.

[11] Patent Number: 6,040,030
[45] Date of Patent: Mar. 21, 2000

[54] OPTICAL RECORDING MEDIUM

[75] Inventors: Hajime Utsunomiya; Tatsuya Kato; Hiroyasu Inoue, all of Chou-ku, Japan

[73] Assignee: TDK Corporation, Tokyo, Japan

[21] Appl. No.: 09/153,294

[22] Filed: Sep. 15, 1998

[30] Foreign Application Priority Data

Sep. 19, 1997 [JP] Japan ................................. 9-273937

[51] Int. Cl.$^7$ ..................................................... B32B 3/00
[52] U.S. Cl. ...................... 428/64.1; 428/64.4; 428/913; 430/270.13; 430/495.1; 430/945; 369/275.1; 369/275.4
[58] Field of Search .................. 428/64.1, 64.2, 428/64.4, 913; 430/270.13, 495.1, 945; 369/275.1, 275.4, 288

[56] References Cited

U.S. PATENT DOCUMENTS

| | | | |
|---|---|---|---|
| 5,581,539 | 12/1996 | Horie et al. | 369/275.4 |
| 5,652,037 | 7/1997 | Ohkawa et al. | 428/64.1 |
| 5,848,043 | 12/1998 | Takada et al. | 369/116 |

FOREIGN PATENT DOCUMENTS

| | | |
|---|---|---|
| 57-50330 | 3/1982 | Japan . |
| 6-338064 | 12/1994 | Japan . |
| 8-124218 | 5/1996 | Japan . |
| 9-204686 | 8/1997 | Japan . |

OTHER PUBLICATIONS

Related Case "Docket Number 0083–0878–2*, Serial or Patent No. 09/153,294, Filing or Issue Date 09/15/98, Status or Patentee Pending".
Related Case "Docket Number 0083–0949–2, Serial or Patent No. 09/247,085, Filing or Issue Date 02/09/99, Status or Patentee Pending".

*Primary Examiner*—Elizabeth Evans
*Attorney, Agent, or Firm*—Oblon, Spivak, McClelland, Maier & Neustadt, P.C.

[57] ABSTRACT

A method for recording/reproducing an optical recording medium of phase change type is provided. The method enables a high density recording while increase in the cross erase is suppressed. The method also enables an accurate tracking while increase in the crosstalk is suppressed. The method is adapted for use with an optical recording medium of phase change type comprising a substrate having a thickness of up to 0.8 mm wherein lands and grooves on opposite sides of the land are formed on the surface, and both the lands and the grooves are used as recording tracks, and the medium is overwritten at a recording power Pw (mW) and an erasing power Pe (mW) which meet the relation: $(Pw/Pe) \times k^2 \leq 8.5$, when the medium has a recording track pitch P ($\mu$m), the recording/reproducing optical system has a numerical aperture NA, and the recording/reproducing light has a wavelength $\lambda$ ($\mu$m) which meet the relation: $k=(\lambda/NA)/P \geq 1.78$.

12 Claims, 2 Drawing Sheets

$P_{11} = 1.2 \times P_{Pbtm1}$
$P_{21} = (P_{Pbtm1} + P_{Ptop1})/2$
$P_{PT} = \min(P_{11}, P_{21})$ $P_{B1O} = (P_{B1btm} + P_{B1top})/2$ $P_1 = 1.2 \times P_{Pbtm}$
$P_2 = (P_{Pbtm} + P_{Ptop})/2$
$P_{PO} = \min(P_1, P_2)$

OPTICAL RECORDING MEDIUM

BACKGROUND OF THE INVENTION

This invention relates to a method for overwriting a phase change optical recording medium, and an optical recording medium which is overwritten by such method.

Highlight is recently focused on optical recording media capable of recording information at a high density and erasing the recorded information for overwriting. One typical rewritable (or erasable) optical recording medium is of the phase change type wherein a laser beam is directed to the recording layer to change its crystalline state whereupon a change of reflectance by the crystallographic change is detected for reproduction of the information. The phase change optical recording media are of great interest since they can be overwritten by modulating the intensity of a single light beam and the optical system of the drive unit used for their operation is simple as compared with magneto-optical recording media.

Most optical recording media of phase change type used chalcogenide systems such as Be—Te system and Ge—Sb—Te system which provide a substantial difference in reflectance between crystalline and amorphous states and have a relatively stable amorphous state. It was also recently proposed to use new compounds known as chalcopyrites. Chalcopyrite compounds have been investigated as compound semiconductor materials and have been applied to solar batteries and the like. The chalcopyrite compounds are composed of Ib-IIIb-VIb$_2$ or IIb-IVb-Vb$_2$ as expressed in terms of the Groups of the Periodic Table and have two stacked diamond structures. The structure of chalcopyrite compounds can be readily determined by X-ray structural analysis and their basic characteristics are described, for example, in Physics, Vol. 8, No. 8 (1987), pp. 441 and Denki Kagaku (Electrochemistry), Vol. 56, No. 4 (1988), pp. 228. Among the chalcopyrite compounds, AgInTe$_2$ is known to be applicable as a recording material by diluting it with Sb or Bi. The resulting optical recording media are generally operated at a linear velocity of about 7 m/s. See Japanese Patent Application Kokai Nos. (JP-A) 240590/1991, 99884/1991, 82593/1991, 73384/1991, and 151286/1992. In addition to the optical recording media of phase change type wherein chalcopyrite compounds are used, optical recording media of phase change type wherein AgSbTe$_2$ phase is formed with the crystallization of the recording layer is disclosed in JP-A 267192/1992, 232779/1992, and 166268/1994.

In the optical recording media of phase change type, a groove is formed in the substrate for the purpose of tracking, and address information is sometimes loaded in the groove. It has been common to form record marks in the groove, or in the region (land) formed between the adjacent grooves. Recently, land/groove recording has been proposed wherein both the land and the groove are used for the recording tracks to thereby reduce the track pitch and enable a high density recording (Japanese patent Publication No (JP-B) 57859/1988).

When the recording track pitch is reduced as in the case of the land/groove recording, spot of the laser beam used for the recording/reproduction will extend into the adjacent track to result in a phenomenon wherein the signals in the adjacent track are erased in the overwriting (cross erase). Crosstalk in the reproduction is also increased.

The cross erase and the crosstalk may be reduced by using a smaller laser beam spot, and more specifically, by shortening the laser wavelength or increasing numerical aperture (NA) of the optical system. At present, however, a semiconductor laser with a short laser wavelength is insufficient in life, power, cost, and the like, and use of an optical system with a large numerical aperture (NA) is associated with the problem of reduced skew margin of the optical recording medium and reduced focal depth. For example, JP-A 204686/97 describes that the skew margin is proportional to the $\lambda/[t \cdot (NA)^3]$, and Handbook of Magneto-Optical Disc Production (1991, issued from Science Forum) describes that the focal depth is proportional to $\lambda/[2(NA)^2]$ when $\lambda$ stands for wavelength of the recording/reproducing light and t stands for the medium thickness. When the skew margin is small, deformation of the beam spot of the recording light and the reproducing light will be increased upon tilting of the medium to result in significantly increased cross erase and the crosstalk. When the focal depth is shallow, the beam spot will be ambiguous when the focus servo is unstable or the medium has minute deformations, and the cross erase and the crosstalk will also be increased in such case. To reserve the skew margin in the case when an optical system with a large NA is used, the medium thickness may be reduced as described in JP-A 9-204686. However, the skew margin is inversely proportional to $NA^3$ and to the thickness t of the substrate as described above, and when NA is considerably large, the thickness of the resin substrate of the medium should be greatly reduced, and in such a case, the substrate is likely to suffer from minute deformation to require a deep focal depth, and hence, a reduced NA.

As described above, the recording/reproducing wavelength and the NA that enable a stable operation should be adequately selected in correspondence with the state of the art in both economical point of view and in technical point of view such as reservation of the skew margin. In addition, a high density recording should be realized by reducing the recording track pitch, and influence of the cross erase and the crosstalk should be minimized as far as possible.

In view of the recent operational use of DVD-ROM (read only memory DVD), an optical recording medium should be able to handle an animation at a practically acceptable level. Accordingly, an optical recording medium should have an increased volume as well as improved transfer rate. More illustratively, an optical recording medium should have a transfer rate which is at least higher than the average transfer rate of the DVD-ROM, namely, at least 3.5 Mbps (linear velocity of 3.47 m/s). In the case of a recordable system, the transfer rate should be at least twice the transfer rate of a reproduction-only system, and the transfer rate should be as high as at least 20 Mbps to realize a picture quality required in business. The transfer rate can be improved by increasing the linear velocity and the recording density of the medium. Such high linear velocity, however, results in unstable tracking servo to invite increased error, and in extreme cases, the laser beam spot goes off the recording track to render the recording/reproducing operation impossible. When an optical system with a large NA is used to increase the recording density, the focal depth will be shallow as described above, and in such a case, the substrate is required to have a reduced thickness to reserve a sufficient skew margin, and the substrate may then suffer from increased deformation, and hence, unstable servo signals and tracking difficulties. Therefore, increase in the tracking servo signal is required in the medium of large volume and high transfer rate.

SUMMARY OF THE INVENTION

In view of the situation as described above, first object of the present invention is to achieve a high recording density and to suppress increase of the cross erase in an overwritable optical recording medium of phase change type.

Second object of the present invention is to enable an accurate tracking and to suppress increase of the crosstalk after achieving the above-described first object.

Such objects are achieved by any one of the (1) to (12) below.

(1) A method for recording/reproducing an optical recording medium of phase change type comprising a substrate having a thickness of up to 0.8 mm wherein lands and grooves on opposite sides of the land are formed on the surface, and both the lands and the grooves are used as recording tracks, wherein the medium is overwritten at a recording power Pw (mW) and a n erasing power Pe (mW) which meet the relation:

$$(Pw/Pe) \times k^2 \leq 8.5$$

when the medium has a recording track pitch P ($\mu$m), the recording/reproducing optical system has a numerical aperture NA, and the recording/reproducing light has a wavelength $\lambda$ ($\mu$m) which meet the relation:

$$k = (\lambda/NA)P \geq 1.78.$$

(2) The method for recording/reproducing an optical recording medium according to the above (1) wherein said groove has a depth $d_G$, and said substrate has a refractive index n at wavelength $\lambda$ which meet the relation:

$$\lambda/10n \leq d_G \lambda/7n.$$

(3) The method for recording/reproducing an optical recording medium according to the above (1) wherein said groove has a width $w_G$ and said land has a width $w_L$ which meet the relation:

$$0.76 \leq w_L/w_G \leq 1.31.$$

(4) The method for recording/reproducing an optical recording medium according to the above (1) wherein $$P \leq 0.65.$$

(5) The method for recording/reproducing an optical recording medium according to the above (1) wherein said optical recording medium has a reflectance at said wavelength of the recording/reproducing light of up to 17%.

(6) The method for recording/reproducing an optical recording medium according to the above (1) wherein said optical recording medium has a recording layer, and said recording layer has a light absorptivity at said wavelength of the recording/reproducing laser beam such that:

$$Ac/Aa \geq 0.8.$$

when light absorptivity in crystalline region is Ac and light absorptivity in noncrystalline region is Aa.

(7) The method for recording/reproducing an optical recording medium according to the above (1) wherein $$\lambda \leq 0.68.$$

(8) The method for recording/reproducing an optical recording medium according to the above (1) wherein $$NA \geq 0.6.$$

(9) The method for recording/reproducing an optical recording medium according to the above (1) wherein said optical recording medium has a ratio in an absolute value of reproduction output of the land to reproduction output of the groove of up to 2 dB.

(10) The method for recording/reproducing an optical recording medium according to the above (1) wherein absolute value of cross erase is up to 0.3 dB.

(11) The method for recording/reproducing an optical recording medium according to the above (1) wherein crosstalk upon reproduction is up to −20 dB.

(12) An optical recording medium which is recorded and reproduced by any one of the methods of the above (1) to (11).

DETAILED DESCRIPTION OF THE INVENTION

Figure 1:
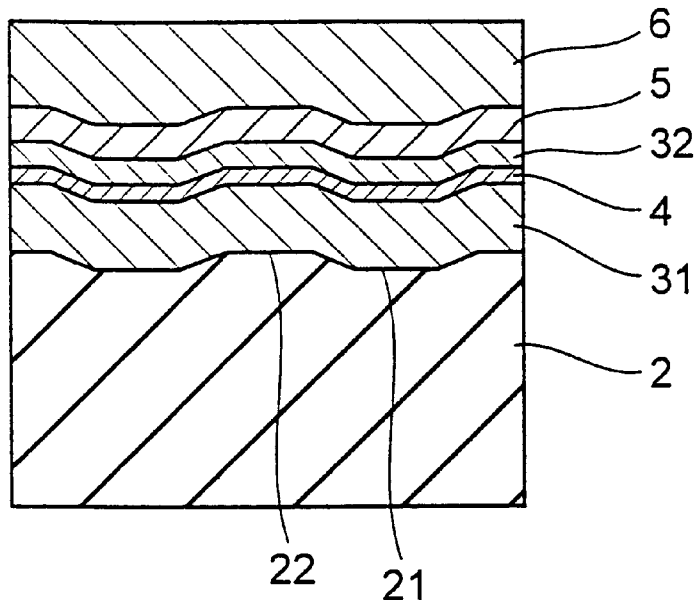
FIG. 1 is a partial cross-sectional view of an embodiment of the optical recording medium according to the present invention.

The method of the present invention is adapted for use with an optical recording medium of land/groove recording type wherein both the land and the groove are used for the recording tracks.

As described above, a high density recording medium which is recorded by land/groove recording is likely to suffer from an increased cross erase. The cross erase of a particular recording track (hereinafter referred to as the track of interest) occurs when the laser beam of recording power is directed to the recording track adjacent to the track of interest and the record marks in the track of interest are heated to a temperature higher than the crystallization temperature and below the melting point and then gradually cooled, namely, when the track of interest experiences thermal hysterisis similar to that of the erasure upon overwriting of the adjacent track. The degree of cross erase increases as the recording track pitch reduces in relation to the laser beam spot. When the recording/reproducing light has a wavelength $\lambda$, the recording/reproducing optical system has a numerical aperture NA, and the medium has a recording track pitch P, the diameter of the laser beam spot is proportional to $\lambda$/NA, and the cross erase increases with the increase in ($\lambda$/NA)/P. ($\lambda$/NA)/P can be reduced by reducing $\lambda$ or by increasing NA. As described above, however, there are a commercially acceptable lower limit for $\lambda$ and a commercially acceptable upper limit for NA in terms of both cost and technical limitations, and there is always a lower limit for $\lambda$/NA in terms of commercial availability corresponding to the state of the art.

By using a conventional phase change optical recording medium, the inventors of the present invention conducted an experiment in which the cross erase was measured when $\lambda$/NA is fixed to a particular value while P is reduced. It was then found that the cross erase significantly increases when ($\lambda$/NA)/P is equal to or greater than 1.78. Accordingly, design of an optical recording medium corresponding to the state of the art can be accomplished by adopting a recording track pitch which meets the relation: ($\lambda$/NA)/P<1.78. If the cross erase can be markedly reduced under the condition of ($\lambda$/NA)/P$\geq$1.78, it in turn means that a high density recording exceeding the state of the art has been realized.

In the present invention, the medium is overwritten at a recording power Pw (mW) and an erasing power Pe (mW) which meet the relation:

$$(Pw/Pe) \times k^2 \leq 8.5$$

when $k=(\lambda/NA)/P$, and by using such recording and reproducing powers, the absolute value of the cross erase can be suppressed to up to 0.3 dB, and even up to 0.2 dB even when $(\lambda/NA)/P$ is equal to or greater than 1.78. For example, there is reported in National Technical Report, vol. 41, No. 6, 1995, pages 615 to 621 that an overwritable DVD comprising a phase change type optical recording disc ($\lambda=680$ nm, NA=0.6, recording track pitch=0.65 $\mu$m) experienced increase of jitter in the adjacent track by cross erase. In contrast, the cross erase can be reduced to 0 dB in the present invention even if the conditions were more strict, for example, when $\lambda$ is 680 nm, NA is 0.6, and the recording track pitch is up to 0.6 $\mu$m.

The condition of the present invention: $(Pw/Pe) \times k^2 \leq 8.5$ is the one derived by the inventors of the present invention after experimentation and theoretical consideration. It has been considered that the cross erase occurs as a result of heat conduction when the laser beam of recording power is directed to the adjacent track. After intimately examining the experimental data, the inventors of the present invention found that, when a laser beam spot having a diameter greatly exceeding the recording track pitch is directed, namely, when $(\lambda/NA)/P$ is equal to or greater than 1.78, the main cause of the cross erase is direct exposure to the laser beam spot near its periphery. In view of such finding, in the present invention, the recording power Pw and the erasing power Pe are brought closer to each other, namely, Pw/Pe is reduced, and in addition, the value of Pw/Pe divided by the square of $(\lambda/NA)/P$ (=k) is limited to below a particular value. By such constitution, absolute value of the cross erase could be reduced to up to 0.3 dB under the severe condition of $(\lambda/NA)/P \geq 1.78$, which condition could not be employed in the prior art because of significant increase in the cross erase.

In the present invention, any value may be selected for the Pw and the Pe as long as they satisfy the relation:

$$(Pw/Pe) \times k^2 \leq 8.5$$

and high quality record marks, and hence, sufficiently low jitter and error as well as sufficient rate of erasure are attained. It is, however, preferable to employ optimal recording power and optimal erasing power for the Pw and the Pe. The optimal recording power and the optimal erasing power are values of or values in the vicinity of the values at which the jitter and the error are minimized, and they may be determined by the exemplary method as will be described later. The optical or thermal design of the medium is then accomplished such that the optimal recording power and the optimal erasing power meet the relation: $(Pw/Pe) \times k^2 \leq 8.5$. The present invention is capable of remarkably reducing the cross erase irrespective of the structure of the medium by limiting $(Pw/Pe) \times k^2$ to $\leq 8.5$. Exemplary media wherein the jitter and the error can be sufficiently reduced, and wherein the relation: $(Pw/Pe) \times k^2 \leq 8.5$ can be realized include the medium wherein reflectance of the crystalline portion is low; the medium of absorptivity control structure; and the medium having a recording layer wherein the crystallization temperature and the melting point are close to each other. The jitter and the error can also be sufficiently reduced while the relation: $(Pw/Pe) \times k^2 \leq 8.5$ is satisfied when a recording laser beam of pulse mode is use and the pulse pattern is optimized.

In the present invention, when the depth $d_G$ of the groove is adjusted to meet the relation:

$$\lambda/10n \leq d_g < \lambda/7n$$

output of the tracking signal will have a sufficient intensity, and the crosstalk can be suppressed to up to 0–20 dB under the condition of $(\lambda/NA)/P \geq 1.78$.

In JP-B 57859/1988, supra, there is described that "the width of the recess portion and the width of the protruding portion were equal to or smaller than the diameter of the light beam directed to the recording medium". JP-B 57859/1988, however, does not at all consider the problems associated with the condition of $(\lambda/NA)/P \geq 1.78$ under which the phenomena different from conventional media occur in relation to the cross erase.

JP-A-338064/1994 discloses an optical recording medium wherein the width of the groove is substantially equal to the width of the land; the optical path length d of the groove depth is such that $\lambda/7 \leq d < \lambda/5$; and the relation between the groove width Wg and the laser beam diameter R ($=0.82 \times \lambda/NA$) is such that $0.34 \leq Wg/R \leq 1.0$. In JP-A-338064/1994, there is described that crosstalk can be reduced by the relation: $\lambda/7 \leq d < \lambda/5$, and the cross erase can be reduced by the relation $0.34 \leq Wg/R \leq 1.0$.

There is some overlap between the relation: $0.34 \leq Wg/R \leq 1.0$ defined in JP-A-338064/1994 and the relation: $(\lambda/NA)/P \geq 1.78$ of the present invention. In Example 1 of JP-A-338064/1994, there is confirmed that the error rate is reduced within the range of $0.34 \leq Wg/R \leq 1.0$ when the optical system wherein $\lambda=780$ nm and NA=0.55 is used. In this Example, however, the medium is overwritten at a linear velocity of 1.25 m/s, which is the same as the one used in CD (compact disc) to record EFM signals of CD standard, and therefore, the record marks have considerable length and linear recording density is low. Therefore, even if the cross erase were relatively high, increase in the error late is not directly induced. The non-strict evaluation in the Example of JP-A-338064/1994 is apparent from the fact that the error rate remains at the reduced level until about ⅓ of the laser beam spot protrudes into the adjacent track (until Wg/R= 0.34).

The medium of land/groove recording is produced for the purpose of high density recording, and the linear recording density is of course higher than that of the CD. Therefore, when $(\lambda/NA)/P \geq 1.78$, increase in the error rate by the cross erase can not be avoided unless the relation: $(Pw/Pe) \times k^2 \leq 8.5$ is satisfied.

In JP-A-338064/1994, there is also disclosed that the thickness of the recording film is limited to below a certain value and that the heat is dissipated by providing a reflective layer which functions as a heatsink to thereby reduce the heat conducted to the adjacent track. In the Example corresponding to such description, Wg is about 0.7 $\mu$m and width of the tapered portion between the groove and the land is about 0.1 $\mu$m, and therefore, $(\lambda/NA)/P$ is about 1.77. On the other hand, the limitation of $0.34 \leq Wg/R$ is effected for the purpose of avoiding the cross erase by direct irradiation of the adjacent track by the recording laser beam. Wg/R of 0.34 corresponds to $(\lambda/NA)/P$ of about 3.6, and as described in JP-A-338064/1994, more than ⅓ of the beam spot extends into the adjacent track. In other words, it is assumed in JP-A-338064/1994 that the influence of the cross erase by direct irradiation is not significant until the beam spot greatly extends into the adjacent track to such extent. In contrast, the inventors of the present invention have found that, even if $(\lambda/NA)/P$ were 1.78, the cross erase does not markedly decrease by facilitating the heat dissipation of the recording track if the linear recording density is high. And from this finding, the inventors of the present invention concluded that the main cause of the cross erase is not the conduction of heat from the adjacent track but direct irradiation by the peripheral part of the recording beam spot. As described above, cross erase by the direct irradiation is not apparent until (λ/NA)/P is about 3.6 in JP-A-338064/1994 because the error rate is measured under the condition of the low linear recording density.

As described above, in the range where there is an overlap between the invention of the JP-A-338064/1994 and the present invention, JP-A-338064/1994 pays no attention to the cross erase by direct irradiation of the adjacent track, and consequently, no countermeasure is taken in JP-A-338064/1994 for such cross erase by direct irradiation in such overlapping range. JP-A-338064/1994 mentions neither the recording power nor the erasing power, and the technical idea of reducing the cross erase by controlling the recording power or the erasing power is neither disclosed nor indicated.

The thickness of the substrate of the medium is not described in the Examples of JP-A-338064/1994. The thickness, however, is estimated to be 1.2 mm since the error rate is measured by using the CD signal.

In addition, when the optical path length d of the groove thickness is adjusted to $\lambda/7 \leq d < \lambda/5$ in accordance with the description of JP-A-338064/1994, tracking signal of sufficient intensity is not obtained while the crosstalk is reduced. As described in JP-A-338064/1994, intensity of the push-pull signal used for the tracking is in its maximum when the groove depth is $\lambda/8n$ (n: refractive index of the substrate). The intensity of the push-pull signal, however, rapidly reduces with the increase in the groove depth. Therefore, in the range of $\lambda/7 \leq d < \lambda/5$, the tracking signal of the intensity required in the optical recording medium of large volume and high transfer rate is not obtained, and the operation is unstable. JP-A-338064/1994 is silent about the tracking problems probably because JP-A-338064/1994 does not assume use of the medium of high transfer rate as demonstrated by the use of the CD linear velocity (1.25 m/s).

JP-A-321078/1996 discloses that the crosstalk may be reduced by using a groove depth d of $\lambda/7 \leq d < \lambda/5$, a groove width GW and a land width LW in the relations of $G_W < L_W$, and $0.62 \times (\lambda/NA) \leq LW \leq 0.80 \times (\lambda/NA)$; and that a narrow track pitch results in poor performance of the land, and in such a case, $G_W$ should be smaller than $L_W$. The relation: $0.62 \times (\lambda/NA) \leq L_W \leq 0.80 \times (\lambda/NA)$ can be rewritten as $1.25 \leq (\lambda/NA)/L_W \leq 1.61$, and therefore, the land width of JP-A-321078/1996 is considerably wider than the land width (which is substantially the same as the recording track pitch) of the present invention. The recording track pitches $[(L_W + G_W)/2]$ used in the Examples of JP-A-321078/1996 are 0.8 μm and 0.7 μm, and $(\lambda/NA)/P \leq 1.77$, and therefore, the medium of JP-A-321078/1996 is not the medium of narrow track pitch of the present invention. It should also be noted that the recording area used in JP-A-321078/1996 is land OR groove, and the land/groove recording is not conducted in JP-A-321078/1996. Therefore, it would be natural to assume that no attention is paid in JP-A-321078/1996 for the significant cross erase that may occur in the land/groove recording.

PREFERRED EMBODIMENTS OF THE INVENTION

Next, the present invention is described in further detail by referring to the embodiments of the invention.

Overwriting

The overwriting of the present invention is performed by using a laser beam modulated to include at least two values, namely, the value at the recording level and the value at the erasing level. The laser beam of the recording power may be applied in pulses. When one signal is recorded by at least two divided portions of irradiation, the heat accumulation in the record mark is suppressed. Then the dilation of the trailing edge of the record mark (known as a teardrop phenomenon) can be prevented, leading to an improved C/N. The pulse irradiation also improves the rate of erasure.

In the present invention, the optical recording medium is overwritten under the conditions such that the recording power Pw (mW) and the erasing power Pe (mW) meet the relation:

$$(Pw/Pe) \times k^2 \leq 8.5,$$

and preferably $$(Pw/Pe) \times k^2 \leq 8.0$$

when the medium has a recording track pitch P (μm), the recording/reproducing optical system has a numerical aperture NA, the recording/reproducing light has a wavelength λ (μm), k=(λ/NA)/P, and $$k \geq 1.78,$$

and preferably $$k \geq 1.80.$$

When the relation of Pw and Pe is outside such range, the cross erase is significantly increased, and hence, the error will be increased. Recording at a higher density is enabled by increasing k while such increase in the value of k requires decrease of Pw/Pe. When the value of Pw/Pe is excessively small, sufficient reduction of the jitter and the error would be difficult, and it is generally preferable that $k \leq 2.7$ and more preferable that $k \leq 2.5$.

In the present invention, any value may be selected for the Pw and the Pe as long as they satisfy the relation:

$$(Pw/Pe) \times k^2 \leq 8.5$$

and high quality record marks, and hence, sufficiently low jitter and error as well as sufficient rate of erasure are attained. It is, however, preferable to select optimal recording power and optimal erasing power for the Pw and the Pe. The merit of the present invention is still realized when the Pw and the Pe are not the so called optimal values.

The optimal recording power and the optimal erasing power are values of or values in the vicinity of the values at which the jitter and the error are minimized, and they may be determined, for example, by the method as described below.

Optimal erasing power (optimal bias power 1) $P_{B1O}$

Figure 3A:
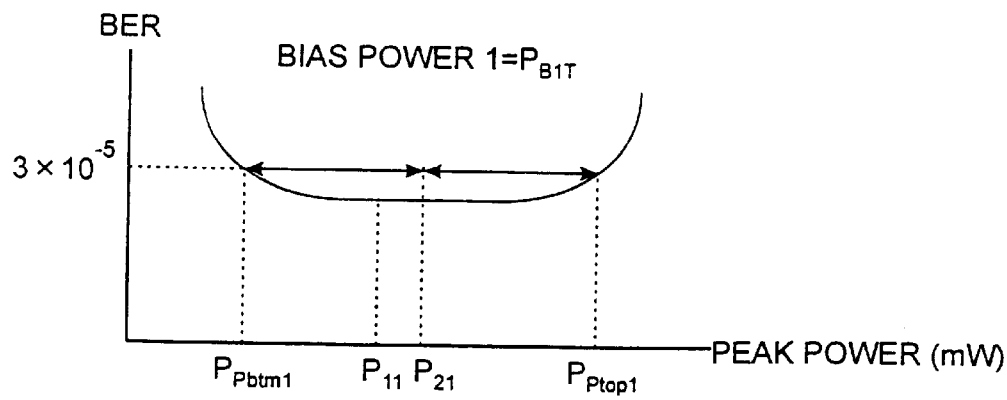
FIGS. 3A, 3B and 3C are graphs for explaining the method for determining optimal erasing power and optimal recording power.

1. Bias power 1 of the drive unit is adjusted to temporary bias power 1 $P_{B1T}$ (for example, 4.0 mW) as shown in FIG. 3(a).

2. The medium is overwritten with random data by varying the peak power, and the bit error rate (hereinafter abbreviated as BER) is measured during the overwriting operation.

3. Peak power $P_{Pbtm1}$ at which the BER is $3 \times 10^{-5}$ on the low power side and peak power $P_{Ptop1}$ at which the BER is $3 \times 10^{-5}$ on the high power side are determined.

4. $P_{11} = 1.2 \times P_{Pbtm1}$ and $P_{12} = (P_{Pbtm1} + P_{Ptop1})/2$ are calculated.

5. The smaller one of $P_{11}$ and $P_{12}$, namely, [min($P_{11}$, $P_{12}$)] is designated temporary peak power PPT.

Figure 3B:
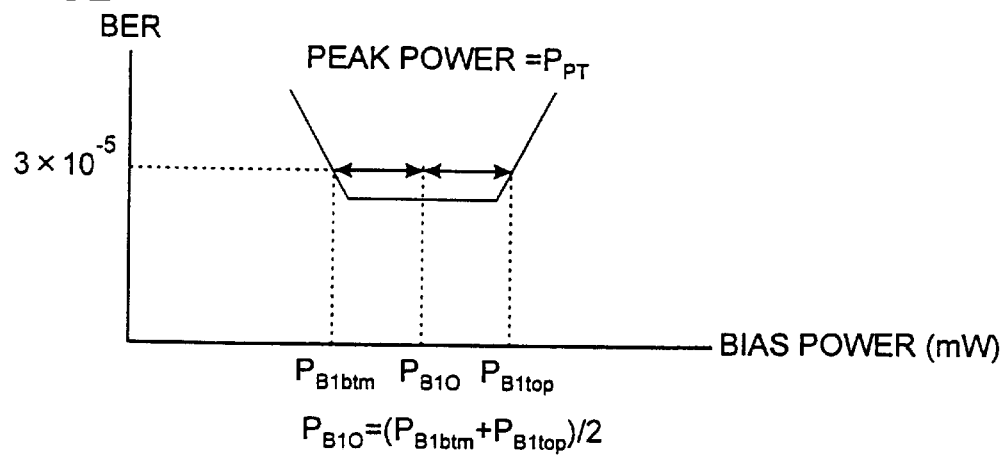

6. The peak power of the drive unit is adjusted to $P_{PT}$ as shown in FIG. 3B.

7. The medium is overwritten with random data by varying the bias power 1, and the BER is measured during the overwriting operation.

8. Bias power 1 $P_{B1btm}$ at which the BER is $3 \times 10^{-5}$ on the low power side and bias power $P_{B1top}$ at which the BER is $3 \times 10^{-5}$ on the high power side are determined.

9. The optimal bias power 1 $P_{B1O}$ is $(P_{B1btm}+P_{B1top})/2$.

Optimal peak power $P_{PO}$

Next, the optimal peak power PPO was determined as described below by using the $P_{B1O}$ determined as described above.

Figure 3C:
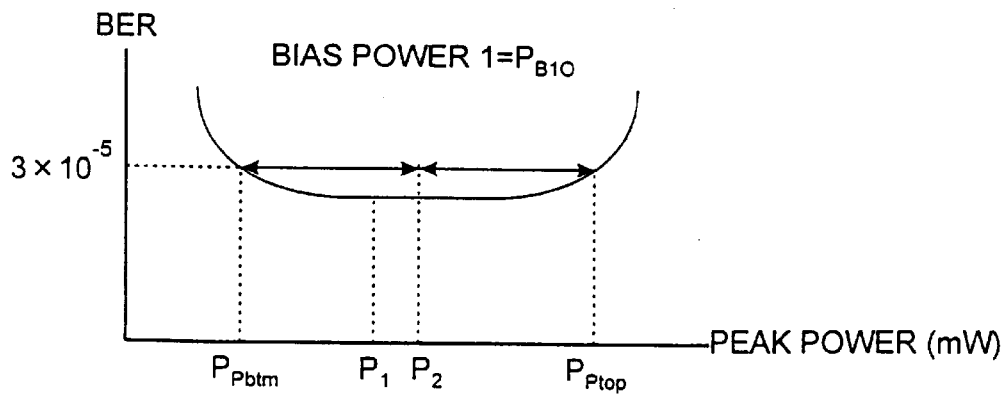

1. Bias power 1 of the drive unit is adjusted to $P_{B1O}$ as shown in FIG. 3C.
2. The medium is overwritten with random data by varying the peak power, and the BER is measured during the overwriting operation.
3. Peak power $P_{Pbtm}$ at which the BER is $3 \times 10^{-5}$ on the low power side and peak power $P_{Ptop}$ at which the BER is $3 \times 10^{-5}$ on the high power side are determined.
4. $P_1=1.2 \times P_{Pbtm}$ and $P_2=(P_{Pbtm}+P_{Ptop})/2$ are calculated.
5. The smaller one of $P_1$ and $P_2$ namely, [min($P_1$, $P_2$)] is designated optimal peak power $P_{PO}$.

The optimal recording power and the optimal erasing power may be determined in accordance with the procedure as described above by using jitter instead of the BER. Although $3 \times 10^{-5}$ is used for the slice level of the BER in the procedure as described above, any value tolerable in the specification and the system where the present invention is applied may be adequately used for the slice level. For the same reason, the slice level is not limited to any particular value when the jitter is used instead of the BER as in the case of the determination using the BER.

In the present invention, it is preferable to use a medium which has been optically and thermally designed such that the optimal recording power and the optimal erasing power meet the relation: $(Pw/Pe) \times k^2 \leq 8.5$. First example of such medium is the medium of low reflectance. The reflectance in this case is the reflectance of the crystalline portion of the recording layer measured from the side of the recording/reproducing light incidence. The reflectance is preferably up to 17%. In the medium having a low reflectance, decrease of the reflectance in the crystalline portion is greater than the decrease of the reflectance in the non-crystalline portion, and therefore, the optimal recording power and the optimal erasing power can be closer to each other. Second example of such medium is the medium of absorptivity control structure. In the medium of absorptivity control structure, the absorptivity of the crystalline portion approaches that of the non-crystalline portion, and therefore, the optimal recording power and the optimal erasing power may be brought close to each other. In the medium of absorptivity control structure, the light absorptivity of the recording layer in the area other than the record marks (in crystalline state) (Ac) and the light absorptivity of the recording layer in the record marks (in non-crystalline state) (Aa) is preferably such that:

$Ac/Aa \geq 0.8$

Third example of such medium is the medium having a recording layer wherein the crystallization temperature and the melting point are close to each other. In the recording layer wherein the crystallization temperature and the melting point are close to each other, the optimal recording power and the optimal erasing power may be brought close to each other. In all of the above described exemplary media, the optimal recording power and the optimal erasing power may be brought close to each other, and the relation: $(Pw/Pe) \times k^2 \leq 8.5$ can be readily met by using optimal Pw and optimal Pe.

The wavelength $\lambda$ of the laser beam used for overwriting and reproduction is not particularly limited. In view of the type of the medium used in the present invention, namely, the high density recording medium, the wavelength $\lambda$ is preferably such that:

$\lambda \leq 0.68$ ($\mu$m)

The numerical aperture NA of the lens of the optical system used for overwriting is not particularly limited. The NA, however, is preferably $NA \geq 0.6$ since high density recording is difficult when the NA is too small.

In the present invention, the linear velocity of the recording layer in relation to the laser beam in the overwriting is generally about 0.8 to 20 m/s. In consideration of the transfer rate, the linear velocity is preferably at least 3.47 m/s, more preferably at least 6 m/s, and still more preferably at least 10 m/s.

Optical Recording Medium of FIG. 1

An embodiment of the optical recording medium which may be used with the present invention is shown in FIG. 1. This optical recording medium is a single side (single substrate) optical recording medium which has a first dielectric layer 31, a recording layer 4, a second dielectric layer 32, a reflective layer 5, and a protective layer 6 on a substrate 2 formed in this order. The present invention is also applicable for a double side recording medium comprising two single side recording media which are adhered to each other by an intervening adhesive layer such that the protective layer 6 is located in the interior side of the resulting medium. The present invention is also applicable for a medium comprising the single side recording medium as described above adhered to a protective substrate by an intervening adhesive layer.

Substrate

The substrate 2 has lands 22 and grooves 21 on opposite sides of the lands 22, and both lands 22 and grooves 21 are used for the recording tracks. The width $W_G$ of the groove 21 and the width $W_L$ of the land 22 are preferably such that:

$0.76 \leq W_L/W_G \leq 1.31$ and more preferably such that.

$0.81 \leq W_L/W_G \leq 1.23$

When the $W_L/W_G$ is excessively small or large, the difference between the reproduction output of the groove and the reproduction output of the land will be undesirably large. It should be noted that, by limiting the $W_L/W_G$ to the above-specified range, absolute value of the ratio of the reproduction output of the groove to the reproduction output of the land can be maintained within the range of up to 2 dB.

In order to accomplish the high density recording, the recording track pitch is preferably up to 0.65 $\mu$m, and more preferably up to 0.6 $\mu$m. It should be noted that the recording track pitch is (groove width +land width)/2.

The depth dG of the groove 21 and the refractive index n of the substrate 2 at the wavelength of $\lambda$ are preferably such that:

$$\lambda/10n \leq d_G < \lambda/7n$$

and more preferably such that:

$$\lambda/9n \leq d_G < \lambda/7n$$

When dG is too small, output of tracking error signal will be reduced and crosstalk will be increased. When dG is too large, output of the tracking error signal will be reduced and output of the reproduced signal will also be reduced.

The substrate 2 may have a thickness of up to 0.8 mm, and preferably, a thickness in the range of 0.2 to 0.65 mm. When the substrate is too thick, skew margin will be excessively small, while an excessively thin substrate 2 is likely to suffer from deformation, and hence, increased error.

Dielectric Layers 31 and 32

In FIG. 1, the first dielectric layer 31 plays the role of preventing oxidation of the recording layer and protecting the substrate by shutting off the heat which can otherwise conduct from the recording layer to the substrate upon recording. The second dielectric layer 32 plays the role of protecting the recording layer and helps the heat remaining in the recording layer after completion of recording release through heat transmission. Further, the provision of both the dielectric layers is effective for improving a degree of modulation.

The dielectric layer used for the first and the second dielectric layer is not limited to any particular type, and various dielectric materials or a mixture thereof as well as various transparent ceramics such as silicon oxide, silicon nitride and ZnS—$SiO_2$ and various species of glass may be used. Also useful are so-called LaSiON materials containing La, Si, O, and N, so-called SiAlON materials containing Si, Al, O, and N, SiAlON containing yttrium, etc.

In the present invention, at least one of the first and the second dielectric layers may preferably contain zinc sulfide, ZnS for optimization of properties such as refractive index. The dielectric layer containing zinc sulfide is hereinafter referred to as ZnS-containing dielectric layer. The ZnS-containing dielectric layer may preferably contain an element whose standard free energy of sulfide formation is lower than the standard free energy of ZnS formation at 0 to 1000° C. (hereinafter referred to as metal element A). Incorporation of the metal element A in the ZnS-containing dielectric layer results in the suppressed release of sulfur upon repeated overwriting, and increase of jitter is thereby prevented. This results in the increased number of overwritable operations.

The metal element A is preferably at least one member selected from Ce, Ca, Mg, Sr, Ba and Na, and use of Ce is most preferable in view of the low standard free energy of sulfide formation. For example, at 300 K, the standard free energy of ZnS formation is about −230 kJ/mol, the standard free energy of CeS formation is about −540 kJ/mol, the standard free energy of CaS formation is about −510 kJ/mol, the standard free energy of MgS formation is about −390 kJ/mol, the standard free energy of SrS formation is about −500 kJ/mol, the standard free energy of BaS formation is about −460 kJ/mol, and the standard free energy of $Na_2S$ formation is about −400 kJ/mol.

In the ZnS-containing dielectric layer, the ratio of the metal element A to the total metal elements is less than 2 at %, preferably 1.5 at % or less, and more preferably 1.3 at % or less. When the ratio of the metal element A is in excess of such range, the effect of suppressing jitter increase upon repeated overwriting is not realized. It should be noted that the ratio of the metal element A is preferably at least 0.01 at %, and more preferably at least 0.03 at % for sufficient realization of the metal element A addition. The ratio of the metal element A to the total metal elements may be determined by fluorescent X-ray analysis or EPMA (electron probe X-ray microanalysis). It should be noted that semi-metal such as silicon is included in the "total metal elements" in the dielectric layer.

The metal element A in the dielectric layer may take form of simple substance, sulfide, oxide, fluoride, or the like.

The ZnS-containing dielectric layer may preferably contain compounds other than zinc sulfide, for example, an oxide, nitride or fluoride. Preferably, such compound is at least one member selected from silicon oxides ($SiO_2$, SiO), tantalum oxide ($Ta_2O_5$), titanium oxide ($TiO_2$), lanthanum oxide ($La_2O_3$), silicon nitride ($Si_3N_4$), aluminum nitride (AlN), magnesium fluoride ($MgF_2$), sodium fluoride (NaF) and thorium fluoride ($ThF_4$).

The content of the zinc sulfide in the ZnS-containing dielectric layer is preferably in the range of from 50 to 95 mol %, and more preferably from 70 to 90 mol %. When the content of the zinc sulfide is insufficient, heat conductivity will be too high and refractive index will be too low, and high C/N can not be obtained. On the other hand, an excessively high zinc sulfide content results in poor rewriting durability. The content of the zinc sulfide in the dielectric layer is calculated in terms of sulfur and zinc contents measured by fluorescent X-ray analysis or the like, and for example, when the zinc content measured is in excess of the sulfur content, the excess zinc is deemed to be present in the form of a compound other than zinc sulfide, for example, ZnO.

An embodiment wherein the metal element A is added to the ZnS-containing dielectric layer has been described in the foregoing. Alternatively, an intermediate layer containing the metal element A may be disposed between the ZnS-containing dielectric layer and the recording layer. Examples of such intermediate layer include the layer containing cerium oxide ($CeO_2$) as simple substance, and the layer containing a mixture of ZnS—$CeO_2$ mixture.

When either one of the first and the second dielectric layers is the ZnS-containing dielectric layer, the dielectric material used for the other dielectric layer, namely, the dielectric layer containing no ZnS is not limited to any particular type, and the dielectric materials as mentioned above other than the zinc sulfide or a mixture thereof may be used.

The lower and the upper dielectric layers may preferably have a refractive index of at least 1.4, especially at least 1.8 in the wavelength range of 400 to 850 nm. This wavelength range covers 780 nm which is the wavelength used in current CD players and 630–680 nm which is a candidate wavelength of the next generation recording technology and represents the range over which the optical recording medium having the recording layer as described below is advantageously operated.

The first dielectric layer 31 is preferably about 50 to 300 nm thick, more preferably 80 to 250 nm thick. Within this thickness range, the first dielectric layer is effective for preventing any damage to the substrate upon recording and higher degree of modulation is available. The second dielectric layer 32 is preferably about 10 to 40 nm, more preferably about 13 to 30 nm thick. This thickness range ensures a fast cooling rate and thus permits to define a record mark with a clear edge, resulting in reduced jitter. Also higher degree of modulation is available.

The dielectric layers are preferably formed by vapor deposition such as sputtering and evaporation, and the metal element A may be incorporated in the dielectric layer by various methods. For example, when the metal element A is cerium, a chip comprising cerium as simple substance or $CeO_2$ may be placed on the main target comprising the main components of the dielectric layer, or alternatively, cerium may be incorporated in the main target in the form of $CeO_2$ or other Ce compounds. When calcium or magnesium is used for the metal element A, it is possible to place a chip comprising CaO or MgO. Such oxides, however, have deliquescence, and use of such chip is undesirable. In such a case, a chip comprising $CaF_2$ or $MgF_2$ may be placed on the main target. The situation is similar when strontium, barium, sodium and the like are used for the metal element A, and use of fluoride chip is more preferable than oxide chip in view of the deliquescence. Alternatively, calcium, magnesium, strontium, barium, and sodium may be incorporated in the main target in the form of oxide or other compounds. The main target may comprise a multi-component target such as $ZnS$—$SiO_2$, or alternatively, ZnS and $SiO_2$ may be separately used for the main targets in simultaneous sputtering.

Recording layer 4

The composition of the recording layer is not particularly limited. However, the present invention is particularly effective when the optical recording medium has a recording layer of In—Ag—Te—Sb based system or Ge—Sb—Te based system.

In the recording layer of indium (In)-silver (Ag)-tellurium (Te)-antimony (Sb) system, the atomic ratio of indium, silver, tellurium, and antimony is preferably represented by the formula (I):

$$\{(In_aAg_bTe_{1-a-b})_{1-c}Sb_c\}_{1-d}M_d \quad (I)$$

wherein letters a, b, c and d are in the range: $0.1 \leq a \leq 0.3$, $0.1 \leq b \leq 0.3$, $0.5 \leq c \leq 0.8$, and $0 \leq d \leq 0.10$, more preferably in the range: $0.11 \leq a \leq 0.28$, $0.15 \leq b \leq 0.28$, $0.55 \leq c \leq 0.78$, and $0.005 \leq d \leq 0.05$.

If the value of a is too small in formula (I), the indium content of the recording layer will be relatively too low and record marks will become less amorphous, resulting in a lower degree of modulation and lower reliability. If the value of a is too large, the indium content of the recording layer will be relatively too high and the reflectivity of regions other than record marks will become low, resulting in a lower degree of modulation.

If the value of b is too small in formula (I), the silver content of the recording layer will be relatively too low and the recrystallization of record marks and hence, repetitive overwriting will become difficult. If the value of b is too large, the silver content of the recording layer will be relatively too high and excess silver will solely diffuse into the antimony phase during the recording and erasure. This results in lower rewriting durability, less stability of both the record marks and the crystalline regions, and a loss of reliability. Specifically, when the medium is stored at elevated temperature, record marks crystallize more to invite drops of C/N and degree of modulation. Additionally, the degradation of C/N and degree of modulation caused by repetitive recording is promoted.

If the value of a+b is too small, tellurium will become excessive to form a tellurium phase, which lowers the rate of crystal transition to hinder erasure. If the value of a+b is too large, it would become difficult to make the recording layer amorphous and it would become impossible to record signals.

If the value of c is too small in formula (I), change of reflectivity associated with a phase change will be sufficient, but erasure would be difficult due to markedly reduced rate of crystal transition. If the value of c is too large, change of reflectivity associated with a phase change will be insufficient to invite drop of degree of modulation.

The element M in formula I is at least one element selected from the group consisting of H, Si, C, V, W, Ta, Zn, Ti, Ce, Tb, Ge, Sn, Pb and Y. The element M is effective for improving rewriting durability, more specifically restraining the rate of erasure from lowering as a result of repetitive rewriting. It is also effective for improving reliability under severe conditions such as hot humid conditions. At least one of V, Ta, Ce, Ge and Y is preferred among the elements M because their effects are more outstanding. V and/or Ta is more preferred, with V being the most preferred.

If the value of d which stands for the content of element M is too large, change of reflectivity associated with a phase change becomes too small to provide a sufficient degree of modulation. If the value of d is too small, effect of the addition of the element M will be insufficient.

Although it is preferred that the recording layer consists essentially of silver (Ag), antimony (Sb), tellurium (Te), indium (In), and optionally added M, it is acceptable that the silver is partially replaced by gold (Au); the antimony is partially replaced by bismuth (Bi); the tellurium (Te) is partially replaced by selenium (Se); and the indium (In) is partially replaced by aluminum (Al) and/or phosphorus (p).

The percent replacement of Ag by Au is preferably up to 50 at %, more preferably up to 20 at %. With a higher percent replacement, record marks are likely to crystallize, leading to a loss of reliability at elevated temperature.

The percent replacement of Sb by Bi is preferably up to 50 at %, more preferably up to 20 at %. With a higher percent replacement, the recording layer would have an increased coefficient of absorption. As a result, the optical interference effect and the difference in reflectivity between crystalline and amorphous regions are reduced, leading to a lower degree of modulation and a lower C/N.

The percent replacement of Te by Se is preferably up to 50 at %, more preferably up to 20 at %. With a higher percent replacement, the crystal transition would be retarded and the rate of erasure be reduced.

The percent replacement of In by Al and/or P is preferably up to 40 at %, more preferably up to 20 at %. With a higher percent replacement, record marks would become less stable with a resultant loss of reliability. The proportion of Al and P is arbitrary.

It is noted that the recording layer of this composition system after repetitive rewriting has a coefficient of absorption k of about 3.3 in the crystalline state and about 2.2 in the microcrystalline or amorphous state.

The recording layer of this composition system preferably has a thickness of about 9.5 to 50 nm, and more preferably, a thickness of about 13 to 30 nm. A too thin recording layer would restrain the growth of a crystalline phase and provide an insufficient change of reflectivity associated with a phase change. A too thick recording layer would invite silver diffusion of an increased amount in the thickness direction of the recording layer upon formation of the record mark which in turn results in the silver diffusion of a reduced amount in the direction of the recording layer, and the resulting recording layer would be less reliable. A too thick recording layer would also provide a lower reflectivity and a lower degree of modulation.

In the recording layer of germanium (Ge)-antimony (Sb)-tellurium (Te) system, the atomic ratio of germanium, antimony and tellurium is preferably represented by the formula (II):

$$Ge_aSb_bTe_{1-a-b} \quad (II)$$

wherein letters a and b are respectively in the range: $0.08 \leq a \leq 0.25$ and $0.20 \leq b \leq 0.40$.

If the value of a is too small in formula (II), record marks are more unlikely to crystallize and the rate of erasure would be lower. If the value of a is too large, much tellurium would bond with germanium with the resultant precipitation of antimony, inhibiting formation of record marks.

If the value of b is too small, the content of tellurium would be too much and record marks are more likely to crystallize when the medium is stored at elevated temperature with a loss of reliability. If the value of b is too large, antimony would precipitate to inhibit formation of record marks.

The recording layer of this composition system preferably has a thickness of about 14 to 50 nm. A too thin recording layer would restrain the growth of a crystalline phase and provide an insufficient change of reflectivity associated with a phase change. A too thick recording layer would provide a lower reflectivity and a lower degree of modulation.

The composition of the recording layer is identifiable by electron probe microanalysis (EPMA), X-ray microanalysis, ICP etc.

The recording layer is preferably formed by sputtering. The conditions for the sputtering are not critical, and when a material containing two or more elements are sputtered, the sputtering may be effected by using an alloy target or by using simultaneous sputtering employing two or more targets.

Reflective layer 5

The reflective layer 5 may be formed from any desired material, and typically, the reflective layer 5 is formed from a metal of high reflectance such as Al, Au, Ag, Pt, Cu, Ni, Cr, or Ti as a simple substance or as an alloy containing at least one of such metals. The reflective layer is preferably about 30 to 300 nm thick. Reflectance will be insufficient with a thickness below this range. A thickness beyond this range will provide no substantial improvement in reflectance and add to the cost. The Reflective layer is preferably formed by vapor deposition such as sputtering and evaporation.

Protective layer 6

The protective layer 6 is provided for improving scratch resistance and corrosion resistance. Preferably the protective layer is formed of an organic material, typically a radiation curable compound or a composition thereof which is cured with radiation such as electron and UV radiation. The protective layer is generally about 0.1 to 100 μm thick and may be formed by conventional techniques such as spin coating, gravure coating, spray coating, and dipping.

Adhesive layer

The adhesive used for the adhesive layer is not limited to any particular type, and the adhesive may be a hot melt adhesives, a UV curing adhesive, or a room temperature curing adhesive, or alternatively, a pressure sensitive adhesive.

Figure 2:
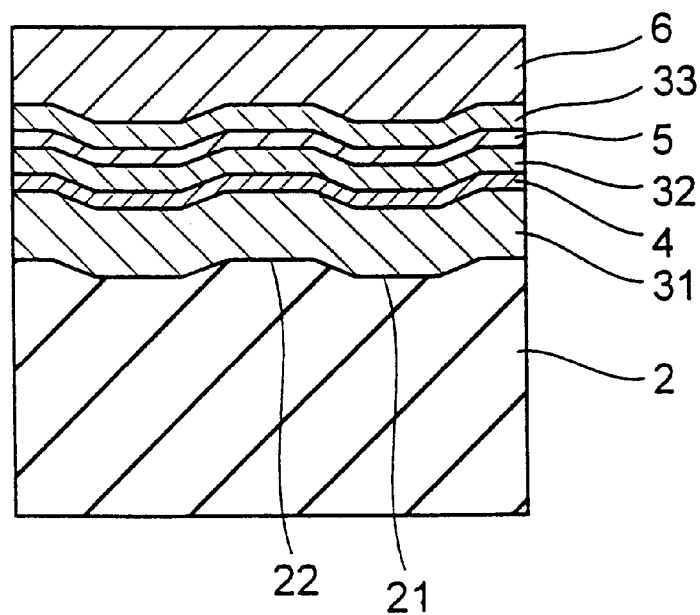
FIG. 2 is a partial cross-sectional view of another embodiment of the optical recording medium according to the present invention.

Optical recording medium of FIG. 2

Referring to FIG. 2, there is illustrated another embodiment of the optical recording medium to which the present invention may be applied. The optical recording medium of this embodiment is of absorptivity control structure as described above. The structure of FIG. 2 has been selected for the reason as described below.

The optical recording medium of phase change type utilizes difference in reflectance between the crystalline and the noncrystalline state, and light absorption (Ac) of the recording layer in the region other than record marks (in crystalline state) and the light absorption (Aa) of the recording layer in the record marks (in noncrystalline state) are often different, and the Ac<Aa is the condition generally found in such situation. It should be noted that Ac and Aa are values measured at the wavelength of the recording/reproducing laser beam. Recording sensitivity and eraseability are thus different depending on whether the region overwritten is crystalline or noncrystalline, and consequently, the record marks of different length and width are formed by the overwriting to invite increase in the jitter often resulting in errors. When mark edge recording wherein the information is encoded in opposite edges of the record marks is adopted for increasing the recording density, variation in the length of the record marks has greater significance and such variation invites increased errors.

In order to solve such a situation, it is preferable that Ac is close to Aa, and more preferable that Ac=Aa, and still more preferable that Ac>Aa in consideration of the latent heat, by regulating the thickness of the recording layer or the dielectric layers sandwiching the recording layer. In the medium of conventional structure, increase of Ac/Aa results in reduced difference between the reflectance (Rc) of the medium of the region other than the record marks and the reflectance (Ra) of the medium in the record marks, and hence, in a reduced C/N.

In view of such situation, JP-A 124218/1996 proposes an optical information recording medium comprising a substrate, a first dielectric layer, a recording layer, a second dielectric layer, a reflective layer, a third dielectric layer, and a UV curing resin layer disposed in this order wherein Ac>Aa, and an extremely thin metal film of high light transmission, Si or Ge is used for the reflective layer, and a dielectric material having a refractive index of higher than 1.5 is used for the third dielectric layer. The relation Ac>Aa is achieved without detracting from the high (Rc-Ra) by providing the reflective layer of high light transmission and the third dielectric layer of high refractive index.

It should be noted that Ac and Aa can be calculated from optical constant of each layer and the wavelength of the recording/reproducing laser beam.

The optical recording medium of FIG. 2 is a single side recording medium wherein the reflective layer 5 is of the constitution as in the case of JP-A 124218/96, and wherein a third dielectric layer 33 is disposed between the reflective layer 5 and the protective layer 6. The substrate 2, the first dielectric layer 31, the recording layer 4, the second dielectric layer 32, and the protective layer 6 are of the constitution as in the case of the optical recording medium of FIG. 1. As in the case of the single side recording medium of FIG. 1, the optical recording medium of FIG. 2 may be adhered with another such medium to form a dual side recording medium, or alternatively, the medium may be adhered to a protective substrate.

In FIG. 2, the reflective layer 5 may comprise an extremely thin layer of a metal of high light transmission or a layer of silicon or germanium having a high transmission for the light of near infrared to infrared region including the recording/reproducing wavelength. The thickness of the reflective layer may be adequately determined to enable the absorption correction between the region other than the record marks and the record marks as described above. The range of the preferable thickness of the reflective layer is significantly different by the material constituting the reflective layer, and the thickness may be determined in accordance with the material. When a metal such as Au is used for the reflective layer, the reflective layer may preferably have a thickness of up to 40 nm, and more preferably 10 to 30 nm. When Si or Ge is used for the reflective layer, the reflective layer may preferably have a thickness of up to 80 nm, and more preferably from 40 to 70 nm. A thickness below this range will invite decline of C/N, and a thickness beyond this range would provide no substantial improvement in the absorptivity control effect.

When the reflective layer 5 is formed from a metal, the reflective layer may preferably comprise Au or an alloy thereof. The Au alloy may comprise the main component of Au and at least one alloying component selected from Al, Cr, Cu, Ge, Co, Ni, Mo, Ag, Pt, Pd, Ta, Ti, Bi and Sb.

The reflective layer 5 is preferably formed by vapor deposition such as sputtering and evaporation.

The third dielectric layer 33 optionally formed on the reflective layer 5 is preferably formed from a material which has a refractive index higher than the protective layer 6. By providing such third dielectric layer 33, the Ac/Aa as described above can be increased while maintaining the difference in reflectivity between the record marks and the region other than the record marks at a sufficient level as in the case of JP-A 124218/1996, supra.

The third dielectric layer 33 is preferably formed from a material adequately selected from the dielectric materials described in the explanation of the first and second dielectric layers.

The third dielectric layer may preferably have a thickness of 30 to 120 nm, and more preferably 40 to 90 nm. An excessively thin third dielectric layer results in the decline of the signal output, and an excessively thick third dielectric layer results in the erasure of the signals in the adjacent track (cross erase).

In the structure as described above wherein Ac and Aa are controlled, the recording/reproducing laser beam is generally directed from the rear side of the transparent substrate and the beam penetrates and goes out from the side of the reflective layer. The light transmittance in such instance is generally at least about 1%, and most preferably at least about 3%. It should be noted that the light transmittance is the value measured when the medium solely comprises the transparent substrate and the inorganic layers, and in the case of the construction of FIG. 2, the value measured for the medium with no protection layer 6. Therefore, the light transmittance is the value as a result of multiple reflection between the inorganic layers, that is, the recording layer, the dielectric layers, the reflective layer, and the like. The light transmittance can be measured with a spectrophotometer. The region measured is not particularly limited, and the light transmittance may be measured either for a crystalline region or for a noncrystalline region. The light transmittance, however, is generally measured for the crystalline region where no grooves are defined (mirror region).

In the optical recording medium having the recording layer of the composition as described above, the light used for the overwriting and reproduction may be selected as desired from a wide range of wavelength, for example, from the range of 100 to 5000 nm.

EXAMPLES

Examples of the present invention are given below by way of illustration and not by way of limitation.

Experiment 1

Optical recording disc samples of single substrate type having the constitution as shown in FIG. 1 were prepared by the procedure as described below.

A disc shaped substrate 2 having a diameter of 120 mm and a thickness of 0.6 mm was prepared by injection molding polycarbonate. A groove and a land of the same width were formed simultaneously with the injection molding on one major surface of the substrate and both were used for the recording. Recording track pitch P is shown in Table 1.

The first dielectric layer 31 was formed by sputtering in argon atmosphere by using ZnS (85 mol %)-SiO$_2$(15 mol %) for the target. The first dielectric layer 31 was formed to a thickness of 260 nm.

The recording layer 4 was formed by sputtering. The composition (atomic ratio) of the recording layer was $$\{(In_aAg_bTe_{1-a-b})_{1-c}Sb_c\}_{1-d}V_d \qquad (I)$$

wherein a is 0.15, b is 0.20, c is 0.59, and d is 0.01. The recording layer 4 was formed to a thickness of 20 nm.

The second dielectric layer 32 was formed by sputtering in argon atmosphere by using ZnS (85 mol %)-SiO$_2$(15 mol %) for the target. The second dielectric layer was formed to a thickness of 20 nm.

The reflective layer 5 was formed by sputtering in argon atmosphere by using Al—Cr alloy for the target. The reflective layer 5 was formed to a thickness of 100 nm.

The protective layer 6 was formed by apply ing a UV curable resin by spin coating and exposing it to UV for curing. The protective layer as cured had a thickness of 100 μm.

The thus produced samples were initialized by a bulk eraser, and evaluated by the procedures as described below for their cross erasure, bit error rate, and degradation of the bit error rate in the repeated overwriting operations. The recording power Pw and the erasing power Pe used in the evaluation were the optimal values determined by the procedure as described above.

Evaluation of cross erase

First, 8T single signal (3.38 MHz at a linear velocity of 12 m/s) was recorded in one arbitrary track, and the carrier output upon reproduction of the thus recorded signal was designated $C_1$. Next, 7T single signal (3.86 MHz at a linear velocity of 12 m/s) was recorded in the tracks adjacent to said track on both side of said track once for each track. Next, the 8T single signal as described above was reproduced again, and the carrier output upon reproduction was designated $C_2$. The cross erase was calculated by $(C_1-C_2)$ [dB]. When there is cross erase, the $C_1$ and the $C_2$ will be such that $C_1>C_2$, and the value of the $(C_1-C_2)$ will be a positive value.

Evaluation of bit error rate

The bit error rate (BER) was evaluated by recording (1–7) RLL recording signals. The bit error rate is preferably up to $3\times10^{-5}$.

Evaluation of degradation of bit error rate by the repeated overwriting operations First, bit error rate of one particular track was measured, and the value measured was designated $B_1$. Next, the tracks adjacent to said track were recorded with (1–7) RLL recording signals for 1000 times, and the bit error rate of the particular track was measured again and designated $B_2$. The degradation of the bit error rate was calculated by $B_2/B_1$. The bit error rate degradation is preferably up to 3.

The results of the measurements are shown in Table 1 together with Pw, Pe, wavelength $\lambda$ of the recording/reproducing laser beam, numerical aperture NA of the optical system used for the overwriting, reflectance of the crystalline portion of the sample, linear velocity $V_O$ of the sample in the overwriting, $k=(\lambda/NA)/P$, and $(Pw/Pe)\times k^2$.

TABLE 1

$\lambda = 0.68$ [$\mu$m], NA = 0.60,
Reflectance 25%,
$v_0 = 12$ [m/s]

| Sample No. | P ($\mu$m) | ($\lambda$/NA)/ P = k | (Pw/ Pe) × $k^2$ | Pw (mW) | Pe (mW) | Cross erase (dB) | BER | BER degradation |
|---|---|---|---|---|---|---|---|---|
| 101 | 0.80 | 1.42* | 5.66 | 12.4 | 4.4 | 0.0 | $1 \times 10^{-8}$ | 1 |
| 102 | 0.75 | 1.51* | 6.44 | 12.4 | 4.4 | 0.0 | $1 \times 10^{-7}$ | 1 |
| 103 | 0.70 | 1.62* | 7.39 | 12.4 | 4.4 | 0.1 | $1 \times 10^{-6}$ | 1.5 |
| 104 | 0.65 | 1.74* | 8.57* | 12.4 | 4.4 | 0.3 | $5 \times 10^{-6}$ | 1.9 |
| 105 | 0.60 | 1.89 | 10.05* | 12.4 | 4.4 | 1.3* | $4 \times 10^{-4*}$ | 15* |
| 106 | 0.55 | 2.06 | 11.97* | 12.4 | 4.4 | 1.8* | $2 \times 10^{-3*}$ | 30* |

*A value outside the scope of the invention or outside the preferable range

As demonstrated in Table 1, the cross erase drastically increases when $k=(\lambda/NA)/P \geq 1.78$, namely, when the recording density exceeds a particular value, and the increase in the cross erase is associated with drastic increase in the bit error rate and its degradation rate.

Experiment 2

Samples shown in Table 2 were prepared as in the case of Sample No. 105 of Table 1 except that the first dielectric layer was deposited to the thickness shown in Table 2. It should be noted that the thickness of the first dielectric layer was varied for the purpose of changing the reflectance. The samples were evaluated for the cross erase as in the case of Experiment 1. The results are shown in Table 2 together with the results of Sample No. 105.

TABLE 2

$\lambda = 0.68$ [$\mu$m], NA = 0.60,
$v_0 = 12$ [m/s]

| Sample No | P ($\mu$M) | ($\lambda$/NA)/ P = k | (Pw/ Pe) × $k^2$ | Pw (mW) | Pe (mW) | Reflectance (%) | Cross erase (dB) | Thickness of the first dielectric layer (nm) |
|---|---|---|---|---|---|---|---|---|
| 201 | 0.60 | 1.89 | 7.33 | 7.4 | 3.6 | 14 | 0.2 | 220 |
| 202 | 0.60 | 1.89 | 7.41 | 8.1 | 3.9 | 17 | 0.2 | 230 |
| 203 | 0.60 | 1.89 | 8.60* | 9.4 | 3.9 | 19 | 0.5* | 240 |
| 105 | 0.60 | 1.89 | 10.05* | 12.4 | 4.4 | 25 | 1.3* | 260 |

*A value outside the scope of the invention or outside the preferable range

As demonstrated in Table 2, even if $k=(\lambda/NA)/P \geq 1.78$, the cross erase can be maintained within the level of up to 0.3 dB when $(Pw/Pe) \times k^2 \leq 8.5$. In addition, in the samples of low reflectance, the optimal recording power and the optimal erasing power can be used to realize the condition: $(Pw/Pe) \times k^2 \leq 8.5$.

Experiment 3

Optical recording disc samples of absorptivity control structure having the constitution as described in FIG. 2 were prepared. The first dielectric layer 31 was as in the case of Sample No. 105 except that the thickness was as shown in Table 3. The thickness was altered for the purpose of changing the Ac/Aa as described above. The recording layer 4 had a composition of Ge:Sb:Te of 2:2:5, and a thickness of 20 nm. The second dielectric layer 32 was as in the case of Sample No. 105 except that the thickness was 15 nm. The reflective layer 5 was formed by sputtering in argon atmosphere using Si for the target. The reflective layer 5 was deposited to 50 nm. The third dielectric layer 33 was formed as in the case of the first and second dielectric layers except that the thickness was 60 nm.

The thus produced samples were initialized by a bulk eraser. After the initialization, the medium from which the protective layer 6 had been removed was irradiated from the side of the substrate 2 with a laser beam at a wavelength of 680 nm to measure the light transmittance of the mirror region (crystalline region) with a spectrophotometer. The light transmittance was measured to be 3 to 9%. The samples had Ac/Aa as shown in Table 3 at the wavelength of 680 nm.

The samples were evaluated for their cross erase as in the case of Experiment 1. The results are shown in Table 3.

TABLE 3

$\lambda = 0.68$ [$\mu$m], NA = 0.60,
$V_0 = 12$ [m/s]

| Sample No. | P ($\mu$m) | ($\lambda$/NA)/ P = k | (Pw/ Pe) × $k^2$ | Pw (mW) | Pe (mW) | Ac/ Aa | Cross erase (dB) | Thickness of the first dielectric layer (nm) |
|---|---|---|---|---|---|---|---|---|
| 301 | 0.60 | 1.89 | 6.63 | 6.5 | 3.5 | 1.2 | 0.0 | 225 |
| 302 | 0.60 | 1.89 | 7.11 | 7 | 3.5 | 1.1 | 0.0 | 215 |
| 303 | 0.60 | 1.89 | 7.43 | 7.5 | 3.6 | 1 | 0.0 | 205 |
| 304 | 0.60 | 1.89 | 7.78 | 8.5 | 3.9 | 0.9 | 0.1 | 195 |
| 305 | 0.60 | 1.89 | 8.27 | 9.5 | 4.1 | 0.8 | 0.3 | 185 |
| 306 | 0.60 | 1.89 | 8.72* | 11 | 4.5 | 0.7 | 0.6* | 165 |

*A value outside the scope of the invention or outside the preferable range

As demonstrated in Table 3, in the samples of absorptivity control structure wherein Ac/Aa is at least 0.8, the optimal recording power and the optimal erasing power can be used to realize the condition: $(Pw/Pe) \times k^2 \leq 8.5$.

Experiment 4

The samples shown in Table 4 were prepared as in the case of Sample No. 303 of Table 3 except that the track pitch P was varied. The thus prepared samples were evaluated for their cross erase by repeating the procedure of Experiment 1. The results are shown in Table 4 together with the results of Sample No. 303.

TABLE 4

$\lambda = 0.68$ [$\mu$m], NA = 0.60,
$v_0 = 12$ [m/s]

| Sample No. | P ($\mu$m) | ($\lambda$/NA)/ P = k | (Pw/Pe) × $k^2$ | Pw (mW) | Pe (mW) | Cross erase (dB) |
|---|---|---|---|---|---|---|
| 401 | 0.80 | 1.42* | 4.18 | 7.5 | 3.6 | 0.0 |
| 402 | 0.75 | 1.51* | 4.76 | 7.5 | 3.6 | 0.0 |
| 403 | 0.70 | 1.62* | 5.46 | 7.5 | 3.6 | 0.0 |
| 404 | 0.65 | 1.74* | 6.33 | 7.5 | 3.6 | 0.0 |
| 303 | 0.60 | 1.89 | 7.43 | 7.5 | 3.6 | 0.0 |
| 405 | 0.55 | 2.06 | 8.85* | 7.5 | 3.6 | 0.8* |

*A value outside the scope of the invention or outside the preferable range

The results in Table 4 also demonstrate the effect of the condition: $(Pw/Pe) \times k^2 \leq 8.5$ in reducing the cross erase.

Experiment 5

The samples shown in Table 5 were prepared as in the case of Sample No. 303 of Table 3 except that the groove depth was varied as shown in Table 3 wherein the groove depth is shown in terms of $\alpha$ when the groove depth dG is represented by $\lambda/(\alpha.n)$ and n is refractive index of the polycarbonate substrate at the wavelength of 680 nm (1.55). The thus prepared samples were evaluated for their output of the tracking error signal and output of the reproduced signal (output of (1–7) RLL signals) at a linear velocity of 12 m/s. It should be noted that the minimum record mark length is 0.44 $\mu$m. Tracking stability was also evaluated at a linear velocity of 12 m/s and 8 m/s. The results are shown in Table 5. The values of the tracking error output shown in Table 5 are relative values. Preferably, the output of the (1–7) RLL signals is at least 200 mW. The results of the Sample No. 303 are also shown in Table 5.

TABLE 5

$\lambda = 0.68$ [μm], NA = 0.60

| Sample No. | $d_G$ (nm) | Output of tracking error signal α | Tracking Linear velocity 12 m/s | Tracking Linear velocity 8 m/s | Output of reproduced signal (mV) |
|---|---|---|---|---|---|
| 501 | 40.00 | 10.9677* | 0.80 | instability | instability | 320 |
| 502 | 45.00 | 9.7491 | 1.00 | instability | stability | 300 |
| 303 | 50.00 | 8.77419 | 1.40 | stability | stability | 270 |
| 503 | 55.00 | 7.97654 | 1.50 | stability | stability | 250 |
| 504 | 60.00 | 7.31183 | 1.30 | stability | stability | 230 |
| 505 | 65.00 | 6.74938* | 1.00 | instability | stability | 180* |
| 506 | 70.00 | 6.86788* | 0.85 | instability | instability | 150* |

*A value outside the scope of the invention or outside the preferable range

The results shown in Table 5 demonstrate that the output of the tracking error signal is increased, an output of the reproduced signal is also sufficiently increased when the groove depth is such that: $\lambda/10n \leq d_G < \lambda/7n$.

As demonstrated in the Experiments as described above, the cross erase can be drastically reduced irrespective of the structure of the medium when $(Pw/Pe) \times k^2$ is limited to below a particular value even if $(\lambda/NA)/P$ was equal to or more than 1.78, namely, even if the ratio of the recording track pitch to the laser beam spot diameter were small and the condition was such that a high cross erase should have occurred before the present invention.

It should be noted that the effects of limiting $(Pw/Pe) \times k^2$ were similar to those of the Experiments as described above when the cross erase was measured by repeating the procedures of the above-described Experiments except that the sample was rotated at a linear velocity of 6 m/s and the composition of the recording layer was optimized in accordance with the linear velocity.

Japanese Patent Application No. 273937/1997 is incorporated herein by reference.

Although some preferred embodiments have been described, many modifications and variations may be made thereto in the light of the above teachings. It is therefore to be understood that, within the scope of the appended claims, the invention may be practiced otherwise than as specifically described.

We claim:

1. A method for recording/reproducing an optical recording medium of phase change type comprising a substrate having a thickness of up to 0.8 mm wherein lands and grooves on opposite sides of the land are formed on the surface, and both the lands and the grooves are used as recording tracks, wherein the medium is overwritten at a recording power Pw (mW) and an erasing power Pe (mW) which meet the relation:

$(Pw/Pe) \times k^2 \leq 8.5$ when the medium has a recording track pitch P (μm), the recording/reproducing optical system has a numerical aperture NA, and the recording/reproducing light has a wavelength λ (μm) which meet the relation:

$k = (\lambda/NA)/P \geq 1.78$.

2. The method for recording/reproducing an optical recording medium according to claim 1 wherein said groove has a depth $d_G$, and said substrate has a refractive index n at wavelength λ which meet the relation:

$\lambda/10n \leq d_G < \lambda/7n$.

3. The method for recording/reproducing an optical recording medium according to claim 1 wherein said groove has a width $w_G$ and said land has a width $w_L$ which meet the relation:

$0.76 \leq w_L/w_G \leq 1.31$.

4. The method for recording/reproducing an optical recording medium according to claim 1 wherein $P \leq 0.65$.

5. The method for recording/reproducing an optical recording medium according to claim 1 wherein said optical recording medium has a reflectance at said wavelength of the recording/reproducing light of up to 17%.

6. The method for recording/reproducing an optical recording medium according to claim 1 wherein said optical recording medium has a recording layer, and said recording layer has a light absorptivity at said wavelength of the recording/reproducing laser beam such that:

$Ac/Aa \geq 0.8$ when light absorptivity in crystalline region is Ac and light absorptivity in noncrystalline region is Aa.

7. The method for recording/reproducing an optical recording medium according to claim 1 wherein $\lambda \leq 0.68$.

8. The method for recording/reproducing an optical recording medium according to claim 1 wherein $NA \geq 0.6$.

9. The method for recording/reproducing an optical recording medium according to claim 1 wherein said optical recording medium has a ratio in an absolute value of reproduction output of the land to reproduction output of the groove of up to 2 dB.

10. The method for recording/reproducing an optical recording medium according to claim 1 wherein absolute value of cross erase is up to 0.3 dB.

11. The method for recording/reproducing an optical recording medium according to claim 1 wherein crosstalk upon reproduction is up to −20 dB.

12. An optical recording medium which is recorded and reproduced by any one of the methods of claims 1 to 11.

* * * * *